United States Patent Office 3,141,917
Patented July 21, 1964

3,141,917
OXYGEN CONVERTER LININGS
Lorne Robert Duncan, Lachute, Quebec, Canada, assignor to Harbison-Walker Refractories Company, Pittsburgh, Pa., a corporation of Pennsylvania
No Drawing. Filed Sept. 27, 1962, Ser. No. 226,719
2 Claims. (Cl. 266—43)

This invention relates to furnace structure for the oxygen steelmaking process. More particularly this invention relates to the working lining of oxygen steelmaking vessels.

In the oxygen steelmaking processes, which have been variously designated as the "LD" process, oxygen vessel process, oxygen converter process, etc., the furnace structure normally consists of a metal shell having a refractory lining therein. The lining for oxygen vessels has heretofore generally consisted of an inner or "working" lining of tar bonded, chemically bonded or burned basic brick, an exterior or shell lining of burned magnesite brick and usually an intermediate layer of a tar bonded ramming mix of a composition similar to that of the working lining. The invention is primarily concerned with the working lining and a composition suitable for use therein.

Because of much greater economy, the oxygen converter process is receiving greater acceptance by the steelmaking industry each passing day. This process is unique in many ways but one of the most problematic of its unique facets, as far as the refractory manufacturer is concerned, is the unusually corrosive nature of oxygen steelmaking slag.

Typically the lining of an oxygen converter has been made of basic refractories because the slag of the oxygen steelmaking process is itself basic. Prior refractories most commonly used are those consisting essentially of tar impregnated or tar bonded dead burned magnesite or dead burned dolomite and sometimes lime mixed with the foregoing. An example of a prior lime and magnesite mixture is one made according to the teachings of U.S. Application S.N. 38,438, abandoned in favor of copending continuation-in-part application Serial No. 266,796, filed March 21, 1963, King et al. owned by the same assignee of the instant invention. An example of a prior dolomite and magnesite mixture would be one made according to teachings of the U.S. Patent 2,943,240 to Martinet. An example of a tar impregnated dead burned magnesite refractory would be one made according to the teachings of U.S. application S.N. 113,094 Davies et al., now United States Patent No. 3,106,475, owned by the same assignee as the instant invention.

Previously, workers in the art of using basic refractory materials to fabricate oxygen converter linings have considered very high purity, or impurities neutralization, to be the controlling factors.

The refractory compositions of the foregoing applications and patent have been used in oxygen converter type vessels with varying degrees of success, and it is the purpose of this invention to provide improved lining compositions of the foregoing type.

It is a specific object of this invention to provide an improved tar bonded unburned basic refractory composition suitable for use in oxygen converters.

Very briefly, this invention is concerned with a novel composition having particular utility for lining the cone section and splash zone of an oxygen converter. The composition consists of any suitable hydration resistant size graded basic refractory aggregate of such as dead burned dolomite, magnesite, lime, and mixtures thereof (such as disclosed in the applications and patent discussed above). However, the fines fraction of the composition must be stringently and critically controlled. The fines must consist essentially of a major amount of MgO, a minor and small amount of CaO and $SiO_2$, with traces only of $Al_2O_3$ and $Fe_2O_3$. The CaO and $SiO_2$ in the fines must be present in a weight ratio, respectively, in excess of about two to one. However the total CaO must be under 5%, based on the total weight of the fines.

Usually, the same process equipment is used for separately dead burning the various refractory oxides to be later mixed to make the refractory shapes for the converter linings. Thus, clean-out has become a major problem. In order to assure the necessary purity and chemical content, it has not been abnormal to waste large quantities of intermediate composition material, which would be a mixture of a composition previously subjected to the process equipment and that subsequently subjected to the same equipment. According to this invention, however, it has been discovered that a certain fraction of such previously wasted transition material is extremely beneficial when used in the fines fraction of the batch used to manufacture refractory shapes used in oxygen converter vessels. Usable material is that which consists essentially of magnesia (MgO), lime (CaO), and silica ($SiO_2$). Only trace amounts of other materials may be present. The lime (CaO) must be balanced with silica ($SiO_2$) in a weight ratio which exceeds 2 CaO to 1 $SiO_2$, on the basis of an oxide analysis. Further, the total CaO content cannot exceed 5% by weight. When in excess of 5%, increased amounts of unstable hydration susceptible materials may form, particularly in the presence of the normally occurring impurities $Al_2O_3$ and $Fe_2O_3$. Further, when an excess of available $SiO_2$ is present CaO and $SiO_2$ may undesirably react with MgO to form merwinite.

It is thought a brief discussion of the chemistry of oxygen converter slag, the nature of its changing composition and the nature of its attack of refractories will provide a better understanding of the invention.

In addition to minor components, oxygen converter slag contains four active fluxes, i.e. silica and lime which make up about 70 to 75% of the slag, and about 10 to 20% of iron oxide, the remainder being manganese oxide. Because of the rapid oxidation rate of the silicon in the metal to silica and the slow absorption of the lime which is added to the process to form slag, the siliceous slag in the first 50 to 60% of the oxygen blowing has a lime to silica ratio of below 2 to 1. As the oxygen blow continues the lime gradually reacts and at the very end of the blow the iron oxide increases very rapidly along with the elimination of carbon from the metal. In the earlier period of the blow a slag can attack a basic refractory as follows:

| Slag | Re-fractory | Products | Products melt at— | |
|---|---|---|---|---|
| $CaO+SiO_2$ | + | $CaO = (CaO)_2SiO_2$ | 3,835° F | (1) |
| $Fe_2O_3$ | + | $2 CaO = (CaO)_2Fe_2O_3$ | 2,620° F | (2) |
| FeO | + | CaO No Compound | about 2,550° F | (3) |
| $CaO+SiO_2$ | + | $MgO = CaO.MgO.SiO_2$ | 2,700° F | (4) |
| $Fe_2O_3$ | + | $MgO = MgO.Fe_2O_3$ | | (5) |
| FeO | + | $MgO = (MgO.FeO)ss^*$ | Variable solid solution. | (6) |
| MgO | + | $MgO = (MgO.MgO)ss^*$ | Variable solid solution. | (7) |

* Solid solution.

Near the end of the oxygen blow, after the slag has a lime-silica ratio higher than about 2 to 1, reactions 2, 3, 5, 6, and 7 continue and reactions 1 and 4 substantially have ceased. When one considers the foregoing equations, all other things being equal, it appear the best refractory composition is one which will be attacked and destroyed by the slag at a minimum rate, since all of the basic refractory compositions discussed above, i.e. dolomite (containing CaO and MgO), magnesite and lime all tend to react with the slag. Again considering the equations, as long as chemical reactions must occur the most desirable reaction product is one which has the highest melting point. This would be that formed according to Equation 1. It has been discovered that by maintaining a $CoO/SiO_2$ ratio above about 2 to 1 with the CaO content being less than 5%, by weight, in the fine fraction of the material making up the composition used in the lining, that Equation 1 occurs to the substantial exclusion or apparent suppression of the other reactions which tend to form less refractory, i.e. lower melting point, compositions.

The exact grind of raw material used to fabricate refractories according to this invention will be understood by those familiar with the refractory art. One example suited for many purposes is a grind of $-4+10$, 20%; $-10+28$, 30%; $-28+65$, 12%; with the remainder being $-65$. Mixing and manufacturing of the brick batch and shapes may be according to any of the techniques well known to those skilled in the art. The coarse fraction of the mix may be of any commercial dead burned dolomite such as for example one having the following composition.

|  | A<br>D. B. Commercial Dolomite | B<br>D. B. Pure Dolomite |
|---|---|---|
| MgO | 38.9 | 41.8 |
| CaO | 53.0 | 57.7 |
| $SiO_2$ | 1.2 | 0.1 |
| $Al_2O_3$ | 0.8 | 0.1 |
| $Fe_2O_3$ | 5.1 | 0.2 |

Further, if desired, the coarse fraction may be such as one of the following materials commercially termed "dead burned magnesite," or mixtures thereof with dolomite.

| Dead Burned Magnesite | C | D | E | F | G | H |
|---|---|---|---|---|---|---|
| MgO (by difference) | 85.7 | 94.8 | 88.7 | 96.1 | 61.0 | 96 |
| CaO | 5.1 | 1.5 | 3.3 | 1.4 | 22.0 | 2.6 |
| $SiO_2$ | 4.3 | 2.8 | 0.6 | 1.6 | 9.5 | 0.8 |
| $Al_2O_3$ | 0.8 | 0.3 | 0.6 | 0.3 | 1.0 | 0.3 |
| $Fe_2O_3$ | 4.1 | 0.6 | 6.5 | 0.6 | 6.5 | 0.3 |

It is the content and chemical make-up of the fines that is important to this invention. By "fines," the $-65$ fraction of the mix is intended.

As noted above, it is by controlling the $CaO/SiO_2$ weight ratio above about 2 to 1 and the CaO content less than about 5%, by weight, that the improved results of this invention are obtained. The lime in excess of the 2 to 1 ratio must be available lime. It is this ratio of lime to silica in a physical form of fine subdivision that appears to provide better service performance for refractories according to this invention.

The fine fraction of the mix can be, for example, composed entirely of the dead burned magnesite designated "H" above. It can also be a 98% MgO magnesite suitably adjusted in composition by additions of lime and silica to fulfill the necessary $CaO/SiO_2$ ratio requirements mentioned above.

Using compositions according to this invention, it appears that upon contact with this early slag in the oxygen converter process that the high temperature and highly corrosive nature thereof promotes a chemical reaction with the fines with commensurate formation of a thin dicalcium silicate (Equation 1 above) layer over the interface between the slag and the refractory lining. This dicalcium silicate layer protects the refractory from later slag.

During the sequentially following treatment cycles additional incremental portions of the refractory are again exposed to the corrosive early slag, again forming the desired thin layer of dicalcium silicate.

The mention of MgO, CaO, $SiO_2$, $Al_2O_3$ and $Fe_2O_3$ in the foregoing discussion is in conformity with the practices of reporting the chemical analysis of refractory materials on the basis of an oxide analysis, and in which the various elements are considered to be present as the simple oxides even though they may not be. For example, any silicon would be reported as $SiO_2$. All percentages and parts are by weight, and all screen sizes are Tyler standard screen sizes.

Having thus described my invention in detail and with sufficient particularity as to enable those skilled in the art to practice it, what I desire to have protected by Letters Patent is set forth in the following claims.

I claim:

1. In an oxygen converter furnace lining, tar bonded basic refractories made from a tar bonded batch of size graded refractory material comprising mixtures of commercial dead burned dolomite, dead burned magnesite and lime, said mixtures having between about 0.5 to 10% $SiO_2$, by weight, on an oxide basis, said batch including a $+65$ and a $-65$ mesh fraction, the improvement which comprises said $-65$ mesh fraction of the batch having a CaO to $SiO_2$ weight ratio, on the basis of an oxide analysis, which exceeds about 2 to 1, and the CaO content thereof being no more than 5%, by weight, said $-65$ mesh fraction being capable of reacting with the early slag of an oxygen converter furnace to form a thin layer of dicalcium silicate over exposed surfaces.

2. In combination with an oxygen converter and like furnaces, shapes made from size graded basic refractory batches bonded with selected, nonaqueous, cokable, carbonaceous bonding material, the refractory of the batches comprising mixtures of commercial dead burned dolomite, dead burned magnesite and lime, said mixtures having between about 0.5 to 10% $SiO_2$, by weight, on an oxide basis, said batch including a $+65$ and a $-65$ mesh fraction, the improvement which comprises said $-65$ mesh fraction of the batch having a CaO to $SiO_2$ weight ratio, on the basis of an oxide analysis, which exceeds about 2 to 1, and the CaO content thereof being no more than 5%, by weight, said $-65$ mesh fraction being capable of reacting with the early slag of an oxygen converter furnace to form a thin layer of dicalcium silicate over exposed surfaces.

References Cited in the file of this patent

UNITED STATES PATENTS

| 540,465 | Talbot | June 4, 1895 |
| 2,229,297 | Lee | Jan. 21, 1941 |
| 2,230,142 | Longacre | Jan. 28, 1941 |
| 2,407,725 | Schoenlaub | Sept. 17, 1946 |